Jan. 17, 1950    G. E. INGRAM    2,494,946
TRACTOR MOUNTED SIDE DELIVERY RAKE
Filed Dec. 20, 1946    3 Sheets-Sheet 3

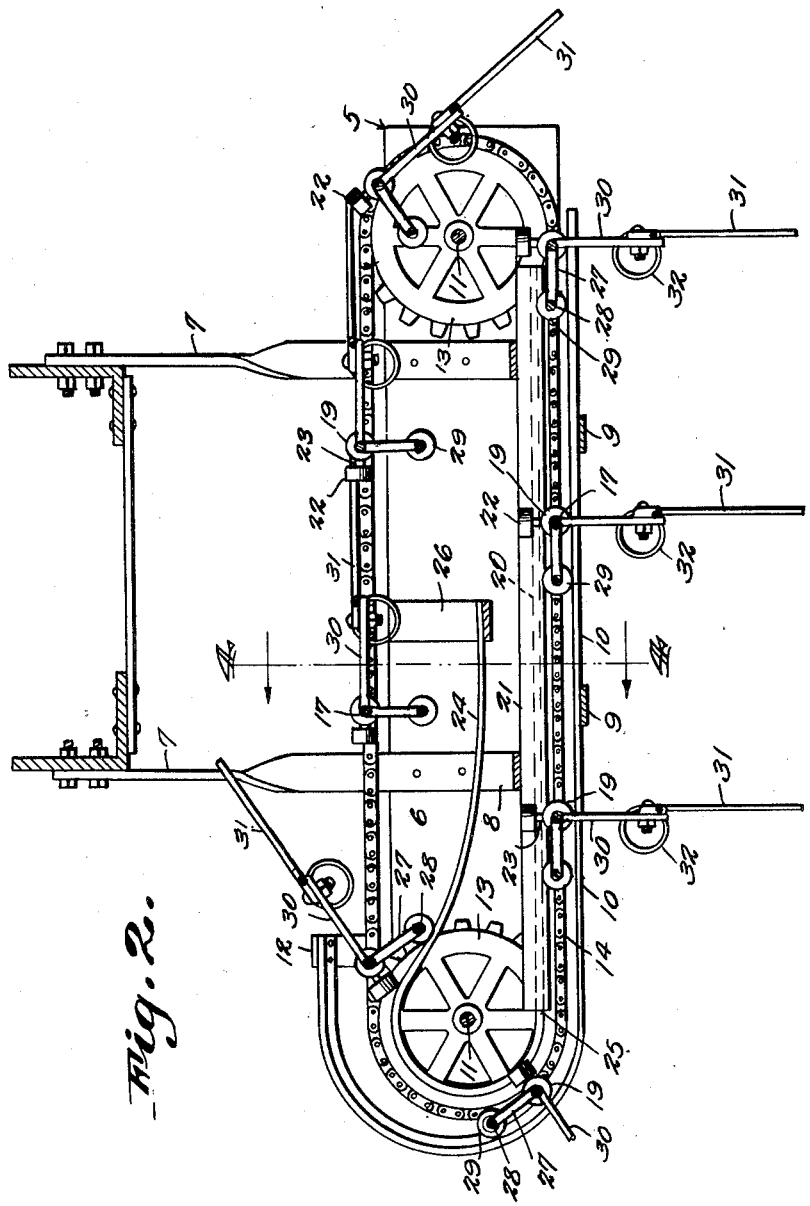

Glen E. Ingram
INVENTOR
BY CA Snowles.
ATTORNEYS.

Patented Jan. 17, 1950

2,494,946

UNITED STATES PATENT OFFICE 2,494,946

TRACTOR MOUNTED SIDE DELIVERY RAKE

Glen E. Ingram, Sioux Rapids, Iowa

Application December 20, 1946, Serial No. 717,556

2 Claims. (Cl. 56—27)

This invention relates to agricultural machines, the primary object of the invention being to provide a machine which may be attached to a tractor used in pulling plows, the attachment being so constructed that it will rake the surface in advance of the plow and deposit the stubble, corn stalks, bean hay or other trash, into the furrow previously formed by the plow, thereby clearing the ground surface directly in front of the plow.

An important object of the invention is to provide a device of this character including spring teeth which operate in an endless chain, transversely of the path of travel of the machine, the spring construction of the teeth permitting the teeth to yield when in contact with irregularities, such as stones, or the like, in the field over which the device operates.

Still another object of the invention is to provide means whereby the spring teeth will be automatically moved into and out of operation, as the tractor is moved along over the ground surface being plowed.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings:

Figure 2 is a side elevational view of the raking device.

Figure 1:
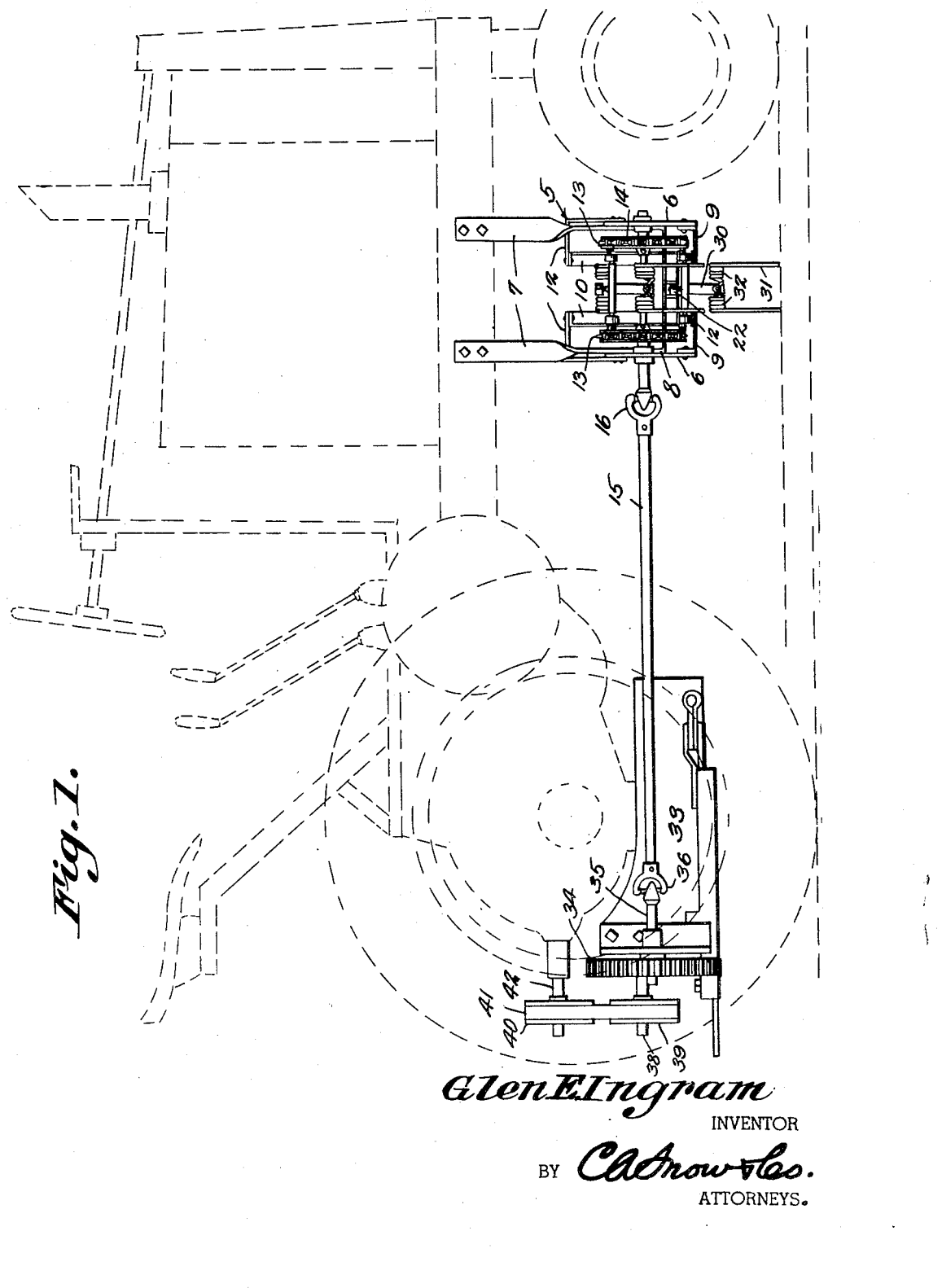
Figure 1 is a side elevational view of a raking device, constructed in accordance with the invention, illustrating the manner of supporting the device on a tractor.

Referring to the drawings in detail, the reference character 5 indicates a housing or support for the endless rake, forming the present invention. The housing embodies side plates 6, to which the supporting arms 7 are bolted, the supporting arms 7 forming a part of the U-shaped brackets 8.

Secured to the side plates 6 and extending inwardly therefrom, in longitudinal spaced relation with respect to each other, are supporting arms 9 to which the tracks 10 are secured.

The plates 6 are formed with bearing openings to receive the ends of the shaft 11, which shafts are supported adjacent to the ends of the plates, as clearly shown by Figure 2 of the drawings.

Figure 4:
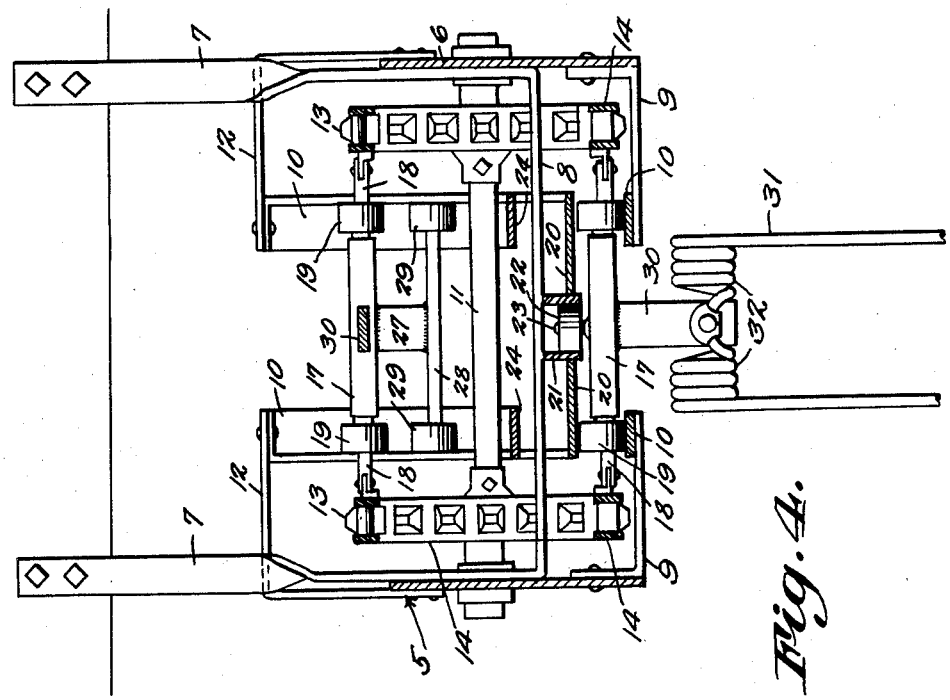
Figure 4 is a sectional view taken on line 4—4 of Figure 2.
Figure 3:
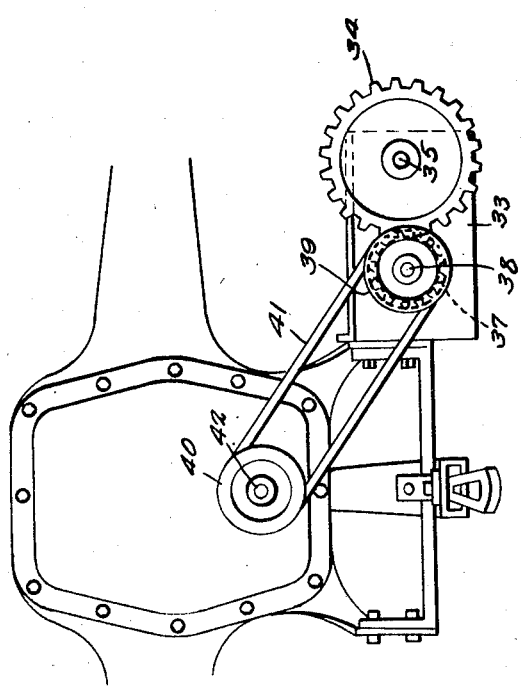
Figure 3 is a rear elevational view illustrating the rear end of the tractor and power take-off reduction gearing used in operating the endless rake.

The tracks 10 curve upwardly and rearwardly at one end of the housing, where they are connected with the inwardly extended arms 12 that are bolted to the side plates 6, as shown by Figure 4. Mounted on the shafts 11, to move therewith, are sprockets 13, the sprockets being arranged adjacent to the ends of the housing, where they receive the endless chains 14 which operate thereover. One of the shafts 11 extends an appreciable distance beyond the housing, where it has connection with the drive shaft 15, through the universal coupling 16, so that rotary movement of the drive shaft 15 is transmitted to the sprocket wheels at one end of the housing through the shaft 11, on which the sprockets are mounted. The chain 14 operating over the sprockets, causes rotation of the sprockets at one end of the housing, by rotary movement of the sprockets at the opposite end of the housing.

Pivotally connected with the chains 14 at opposite sides of the housing, are rake-teeth supports, each of which includes a T-shaped member 17, having small shafts 18 extending therefrom, on which shafts 18 are mounted, the rollers 19, which rollers operate over the tracks 10. Directly above the tracks 10 and extending in parallel relation with the tracks 10, are plates 20, which are so disposed with respect to the tracks 10, that a clearance is provided for the rollers 19 to permit the rollers to move between the plates 20 and tracks 10. Disposed between the plates 20 and arranged in parallel spaced relation with each other, are vertical plates 21, between which the rollers 22 operate, the rollers 22 being mounted on the vertical shafts 23, so that they operate in horizontal planes. These vertical plates provide a guide for the rollers 22 and prevent lateral movement of the teeth and their supports, when the machine is in operation.

The plates 21 are welded or otherwise secured to the U-shaped brackets 8, as shown by Figure 4 of the drawing.

Disposed within the confines of the plates 6, are downwardly curved tracks 24, which are secured at one of the respective ends within the housing at 25, the opposite ends of the tracks being secured to the arms 26. These tracks 24 provide cams for operating the teeth of the rake. Secured to each T-bar 17, is an arm 27 to which an axle 28 is welded, the axles 28 supporting rollers 29 at their ends, which rollers 29 are adapted to move over the spaced downwardly curved tracks 24. As shown the arms 27 extend at right angle with respect to the shanks 30 of the members 17, and consequently also extend at right angles with respect to the spring teeth 31. These spring teeth 31 are formed by bending a length of spring wire material intermediate its ends, providing spring coils 32, to the end that the teeth 31 will be permitted to swing or move inwardly when the teeth are moved into contact with obstructions or irregularities in the field over which the device is moving.

It will, of course, be understood that these spring teeth are arranged on the chains in predetermined spaced relation with respect to each other, when in operation.

In addition to the housing and spring-tooth operating mechanism, the invention includes a support 33 which is bolted to the tractor, in proximity to the rear end of the tractor, the support providing a mounting for the gear 34 mounted on one end of the shaft 35 which is connected to the drive shaft 15 through the universal coupling 36. Meshing with the substantially large gear 34, is a small gear 37, mounted on the shaft 38, which is also journaled in bearings formed in the support 33.

Mounted on the shaft 38 is a pulley 39 that receives motion from the pulley 40 through the belt 41, the pulley 40 being mounted on the power take-off shaft 42 of the tractor.

In the use of the device, it is contemplated to support the housing under the tractor which is used in towing a plow, so that the field or ground surface will be raked in advance of the plow, the stubble, hay, trash or the like being moved laterally and deposited in the furrow previously formed by the plow. This device not only clears the field of objectionable material, but deposits the material in the furrow where it will become decomposed and provide fertilizer for growing plants.

As the teeth of the rake move along the lower flight of the endless chains, they have been moved to their extended positions, or positions at right angles to the chains to contact with the ground surface, raking the ground surface. When the teeth pass one end of the housing, the rollers 29 act to overbalance the teeth and cause them to lie in parallel relation with respect to the endless chains, at the upper flights of the chains, as shown by Figure 2. Thus, it will be seen that when the teeth are not in their raking positions, they are out of the way and will not interfere with the operation of the tractor.

Having thus described the invention, what is claimed is:

1. The combination with a tractor, of a raking device comprising an elongated frame, means for suspending the raking device under and transversely of the tractor, spaced parallel tracks forming a part of the frame, the tracks at one end of the frame being curved upwardly and inwardly, plates spaced above the tracks in parallel relation with the tracks, parallel endless chains operating over the frame, spring raking teeth including shafts, pivotally connected with the parallel chains, rollers mounted on the shafts movable over the parallel tracks in contact with the plates temporarily holding the teeth in vertical raking positions, said rollers being movable over the curved ends of the tracks moving said spring teeth from a vertical raking position with respect to the lower flight of the chains, to horizontal positions out of use and in parallel relation with the upper flight of chains, and means for operating the chains.

2. The combination with a tractor, of a raking device comprising an elongated frame, means for suspending the raking device under and transversely of the tractor, spaced parallel tracks forming a part of the frame, the tracks at one end of the frame being curved upwardly and inwardly, plates spaced above the tracks with their side faces in parallel relation with the tracks, spaced vertical plates arranged between the inner longitudinal edges of the first mentioned plates, parallel chains moving longitudinally of the frame, T-shaped rake teeth supports connected to said chains, supporting rollers on the rake teeth supports movable between the tracks and plates in contact therewith, guide rollers mounted on the rake teeth supports and disposed between the vertical plates holding the rake teeth supports against lateral movement, said supporting rollers being movable over the curved ends of the track moving the rake teeth to a position parallel with the upper flights of the chains, said T-shaped teeth supports overbalancing the teeth at one end of the frame whereby said teeth swing to vertical positions, and means for operating the chains.

GLEN E. INGRAM.

REFERENCES CITED

The following references are of record in the file of this patent:

UNITED STATES PATENTS

| Number | Name | Date |
|---|---|---|
| 431,171 | McPherson | July 1, 1890 |
| 476,961 | McPherson | June 14, 1892 |
| 554,794 | Rex | Feb. 18, 1896 |

FOREIGN PATENTS

| Number | Country | Date |
|---|---|---|
| 20,831 of 1907 | Great Britain | Sept. 10, 1908 |